United States Patent [19]

Shim

[11] Patent Number: 4,958,055
[45] Date of Patent: Sep. 18, 1990

[54] CONTROL CIRCUIT FOR A REFRIGERATOR COMBINED WITH A MICROWAVE OVEN

[75] Inventor: Jae E. Shim, Kyunggi-do, Rep. of Korea

[73] Assignee: Samsung Electronics Co., Ltd., Rep. of Korea

[21] Appl. No.: 353,035

[22] Filed: May 17, 1989

[30] Foreign Application Priority Data

May 17, 1988 [KR] Rep. of Korea ............... 1988-5743

[51] Int. Cl.$^5$ ............................................. H05B 6/68
[52] U.S. Cl. ...................... 219/10.55 B; 219/10.55 R; 219/486; 307/35; 307/39; 361/89; 221/150 HC
[58] Field of Search ............... 219/10.55 B, 10.55 R, 219/486, 506; 361/31, 89, 103, 106, 195; 307/35, 38, 39, 86, 29; 221/150 HC

[56] References Cited

U.S. PATENT DOCUMENTS

| | | | |
|---|---|---|---|
| 3,066,227 | 11/1962 | Rooney | 307/34 |
| 4,068,781 | 1/1978 | Toth | 219/485 X |
| 4,398,651 | 8/1983 | Kumpfer | 219/10.55 B |
| 4,399,352 | 8/1983 | Ueda | 219/10.55 B |
| 4,472,640 | 9/1984 | Elmer | 307/35 |
| 4,847,722 | 7/1989 | Bennett | 219/10.55 B X |

Primary Examiner—Philip H. Leung
Attorney, Agent, or Firm—Saidman, Sterne Kessler & Goldstein

[57] ABSTRACT

A control circuit for a refrigerator combined with a microwave oven includes signal delay selecting and comparing circuitry start sensing circuitry timer circuitry and load driving circuitry in order to properly control operations of the refrigerator and the microwave oven. The control circuit eliminates unnecessary delay time of the operation of the microwave oven during operation of the refrigerator, and makes the refrigerator operate after start-up of the microwave oven is completed.

2 Claims, 3 Drawing Sheets $\Delta t_1$  $\Delta t_2$

| FIRST LOAD | SECOND LOAD | DELAY TIME | OPERATION (MICROWAVE OVEN) |
|---|---|---|---|
| 1 | 1 | 1 | IMMEDIATELY ON |
|   |   | 0 | DELAY |
|   | 0 | 1 | ✕ |
|   |   | 0 | ✕ |
| 0 | 1 | 1 | IMMEDIATELY ON |
|   |   | 0 | IMMEDIATELY ON |
|   | 0 | 1 | ✕ |
|   |   | 0 | ✕ |

CONTROL CIRCUIT FOR A REFRIGERATOR COMBINED WITH A MICROWAVE OVEN

BACKGROUND OF THE INVENTION

1. Field of the Invention

The invention relates to a control circuit for electrical machinery and applicances, and more particularly to a control circuit for a refrigerator combined with a microwave oven.

2. Description of the Prior Art

It is possible that electrical machinery and applicances are provided with at least two inductive loads such as a motor and a compressor, or a refrigerator and a microwave oven, etc.

In a conventional refrigerator combined with a microwave oven, a delay circuit is provided to each load which makes the load operate after a predetermined delay time. Such a delay circuit protects the refrigerator and the microwave oven from being initially overloaded when they are operated simultaneously.

However, there is not protective or control circuitry to protect against the start-up of the refrigerator during the operation of the microwave oven. Moreover, it is not necessary or desirable to delay the operation of the microwave oven, when the compressor of the refrigerator is in an OFF state or when a stable current is supplied through the operating refrigerator. In other words, such a delayed start-up of the microwave oven encumbers the user, causing inconvenience.

SUMMARY OF THE INVENTION

It is an object of the present invention to provide a control circuit, which protects against overloads and the like by delayed operation with respect to the load selected from at least two inductive ones requiring high driving current.

To accomplish the above object, a control circuit is provided according to the present invention to comprise:
- a temperature adjusting means having an operational amplifier, one terminal of which is connected to a variable resistor to determine the input bias level;
- a temperature sensing and controlling means having a differential amplifier which receives the hysteresis output of the temperature adjusting means and compares this hysteresis output with the bias current of a temperature sensing thermister;
- a delay selecting and comparing means having a signal comparator connected to the differential amplifier of the temperature sensing and controlling means and a logic circuit connected to the differential amplifier via a diode;
- a start sensing means having a flip-flop toggled by a switch in order to sense the start of the microwave oven;
- a display means connected to the inverting output terminal of the flip-flop to display the operation of the microwave oven;
- a timer means controlling the delay of the operation of the loads; and,
- a load driving means having transistors and relays receiving signals from the signal comparator and the timer in order to control the drive of the loads.

According to the present invention, the microwave oven may be used regardless of the prior operation of the refrigerator and thus these loads can be operated simultaneously. However, when the user wants to operate the refrigerator during the use of the microwave oven, the operation of the refrigerator is delayed to avoid instantaneous overloads due to simultaneous operation of the microwave oven and the refrigerator.

Consequently, the lifetime of the circuit elements of the products is prolonged and safety is ensured against overcurrent.

BRIEF DESCRIPTION OF THE DRAWINGS

The present invention will now be described in more detail with reference to the accompanying drawings, in which.

DETAILED DESCRIPTION OF A PREFERRED EMBODIMENT

Figure 1:
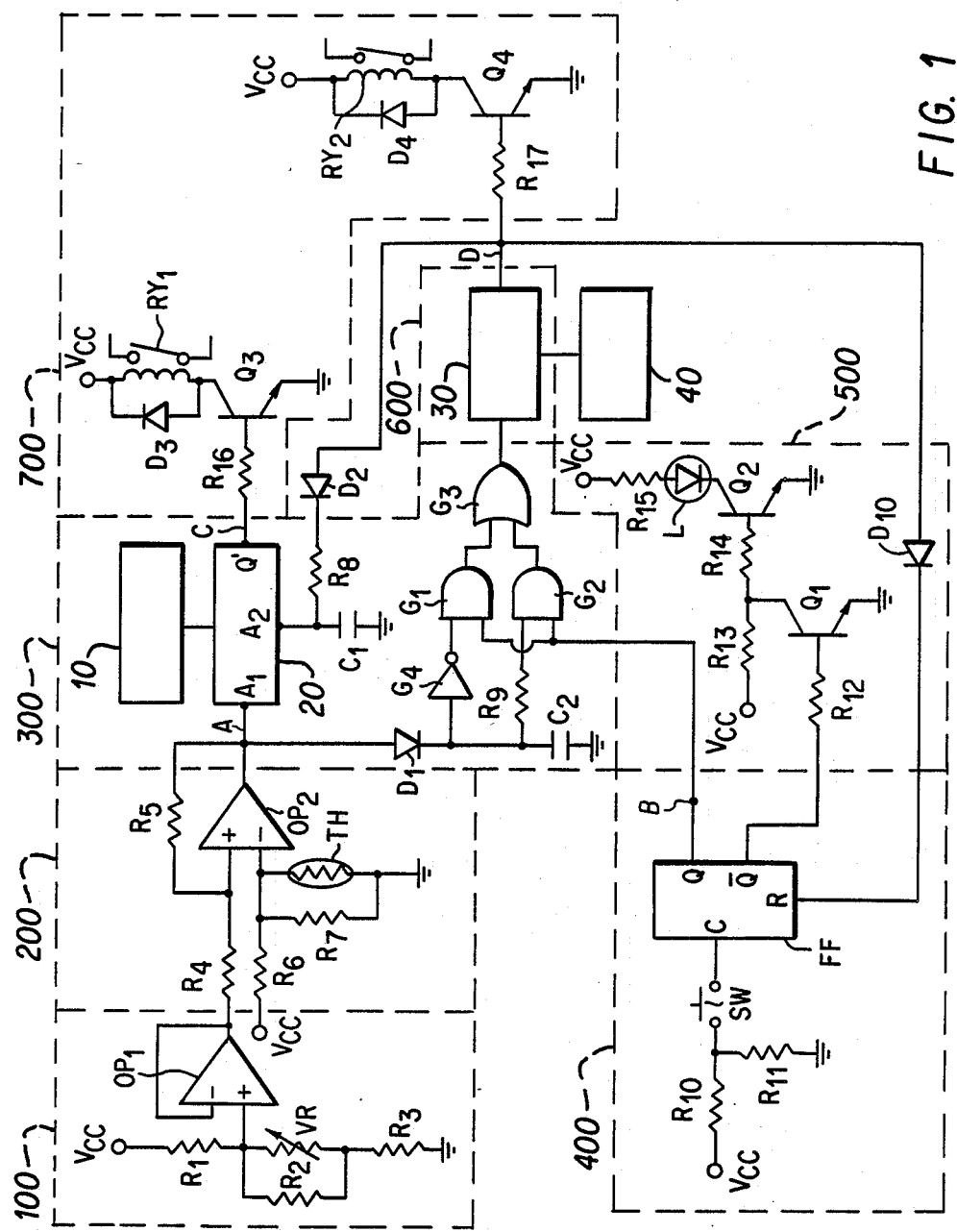
FIG. 1 is a circuit diagram of an embodiment according to the present invention.

In FIG. 1, there is shown a control circuit to control the operation of two loads, i.e. one for the refrigerator and the other for the microwave oven.

In conventional technology, to drive the compressor of the refrigerator, it is well known to control the operation of the compressor by sensing the temperature of the refrigerating compartment and comparing the temperature with a preset one. To set the temperature of the refrigerating compartment, the temperature adjusting section 100 is provided with a operational amplifier $OP_1$ so as to have the current hysteresis width according to the temperature.

The inverting terminal of the operational amplifier $OP_1$ is connected to its output terminal in order to perform a negative feedback and the non-inverting terminal is connected to resistors $R_1$, $R_2$, and $R_3$ and the variable resistor VR which are connected with each other in order to divide the power source voltage Vcc applied to the non-inverting terminal of the operational amplifier $OP_1$. Preferably, the resistor $R_2$ is in parallel connection with the variable resistor VR to make linear the characteristics of the voltage of the variable resistor.

Temperature sensing and control section 200 causes the refrigerator to operate and to stop operating when the temperature of the refrigerating compartment reaches the present temperature.

To this end, a differential amplifier $OP_2$ receives the preset temperature output of the temperature setting section and compares it with the sensed temperature. The non-inverting terminal (+) of the differential amplifier $OP_2$ is connected to the operational amplifier $OP_1$ through a resistor $R_4$ and also connected to its own output terminal through a resistor $R_5$ to perform feedback operation.

The inverting terminal (−) of the differential amplifier $OP_2$ is connected to a thermister TH and a resistor $R_7$ connected in parallel. Power source Vcc is applied through the resistor $R_7$. Therefore, the voltage according to the temperature of the refrigerating compartment is applied to the differential amplifier $OP_2$ by the thermister TH, and in turn the differential amplifier $OP_2$ compares this voltage level with the hysteresis output of the operational amplifier $OP_1$, resulting in that it outputs a high level or a low level in order to determine the operation of the refrigerator.

The operation of the loads is determined by the output of the differential amplifier OP$_2$. When the control circuit is constructed so as to operate the refrigerator and the microwave oven simultaneously, the refrigerator requires a large current (ten plus several Amperes) when it starts its operation and a relatively small current (several Amperes) during its normal operation. However, the microwave oven always requires a large current (tens of Amperes) in normal operation as well as at starting time.

Therefore, it is noted that the control process may be varied according to the operating states of the refrigerator and the microwave oven.

The delay selecting and comparing section 300 is provided with a signal comparator 20 whose terminal A$_1$ is connected to the output terminal of the differential amplifier OP$_2$. The signal comparator 20 is connected to the clock generator 10 and such waveforms as shown in FIG. 3 are applied or output therefrom. When the output A of the differential amplifier OP$_2$ is high level as shown in portion II of FIG. 2, the output from the terminal Q' operates the driving section 700 of the refrigerator which will be described in detail later.

The terminal A$_2$ of the signal comparator 20 is grounded via a capacitor C$_1$ and connected through a resistor R$_8$ and the diode D$_2$ to the timer section 600 which will be described later in detail. The output teminal of the differential amplifier OP$_2$ is connected through a diode D$_1$ to a logic circuit which gives signals to delay the operation of the second load. The logic circuit comprises AND gates G$_1$ and G$_2$, an OR gate G$_3$ and a NOT gate G$_4$. One input terminal of the AND gate G$_1$ is connected to the NOT gate G$_4$ and one input terminal of the AND gate G$_2$ is connected to the delay circuit having a resistor R$_9$ and a capacitor C$_2$ with a predetermined delay time. The other input terminals of the AND gates G$_1$ and G$_2$ are connected to the start sensing section 400 of the microwave oven, the second load, which will be described later in detail. The output of the AND gates G$_1$ and G$_2$ are applied to the OR gate G$_3$. The output of the OR gate G$_3$ of the logic circuit is applied to the timer section 600 having a timer 30 for the user to set the operating time of the microwave oven. The timer 30 is provided with a clock section 40 for receiving clock pulses.

The start sensing section 400 of the microwave oven, the second load, is provided with a one-touch type start switch SW of the microwave oven and a flip-flop FF responsive to ON/OFF operation of the start switch SW which is connected to the clock terminal C of the flip-flop FF. The output terminal Q of the flip-flop FF is connected to the input terminals of the AND gates G$_1$ and G$_2$, the output terminal $\overline{Q}$ thereof is connected to the display section 500 of the microwave oven which will be described later in detail and the reset terminal R thereof is connected to the timer section 600 through a diode D$_{10}$.

In the display section 500 for displaying the oepration of the microwave oven, the base of a transistor Q$_1$ is connected to the terminal $\overline{Q}$ of the flip-flop FF through a resistor R$_{12}$. The emitter of the transistor Q$_1$ is grounded and the collector thereof is connected to the power source Vcc through a resistor R$_{13}$ as well as to the base of a transistor Q$_2$ through a resistor R$_{14}$.

The emitter of the transistor Q$_1$ is grounded and its collector is connected to the power source Vcc through a light emitting diode L and a resistor R$_{15}$ which are conected in series.

On the other and, the load driving section 700 comprises driving circuits for the refrigerator and the microwave oven.

In the refrigerator driving circuit, the base of a transistor Q$_3$ is connected to the output terminal of the signal comparator 20 through a resistor R$_{16}$. The emitter of the transister Q$_3$ is grounded and its collector is connected to a relay RY$_1$ of the refrigerator which is in turn connected to the power source Vcc.

In the microwave oven driving circuit, the base of a transistor Q$_4$ is connected to the timer section 600 through a resistor R$_{17}$. The emitter of the transistor Q$_4$ with a grounded collector is connected to a relay RY$_2$ of the microwave oven which is then connected to the power source Vcc.

The operation of the control circuit of the present invention will now be described in detail.

Figures 2, 4:
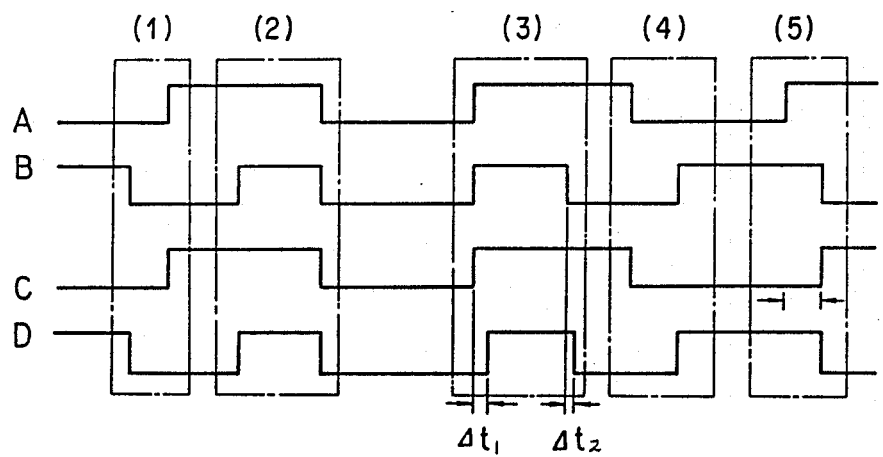
FIG. 2 illustrates waveforms of control signals for the operation of the first and second loads in FIG. 1.
FIG. 4 is a functional truth table of the first and second loads according to the present invention.
Figure 3:
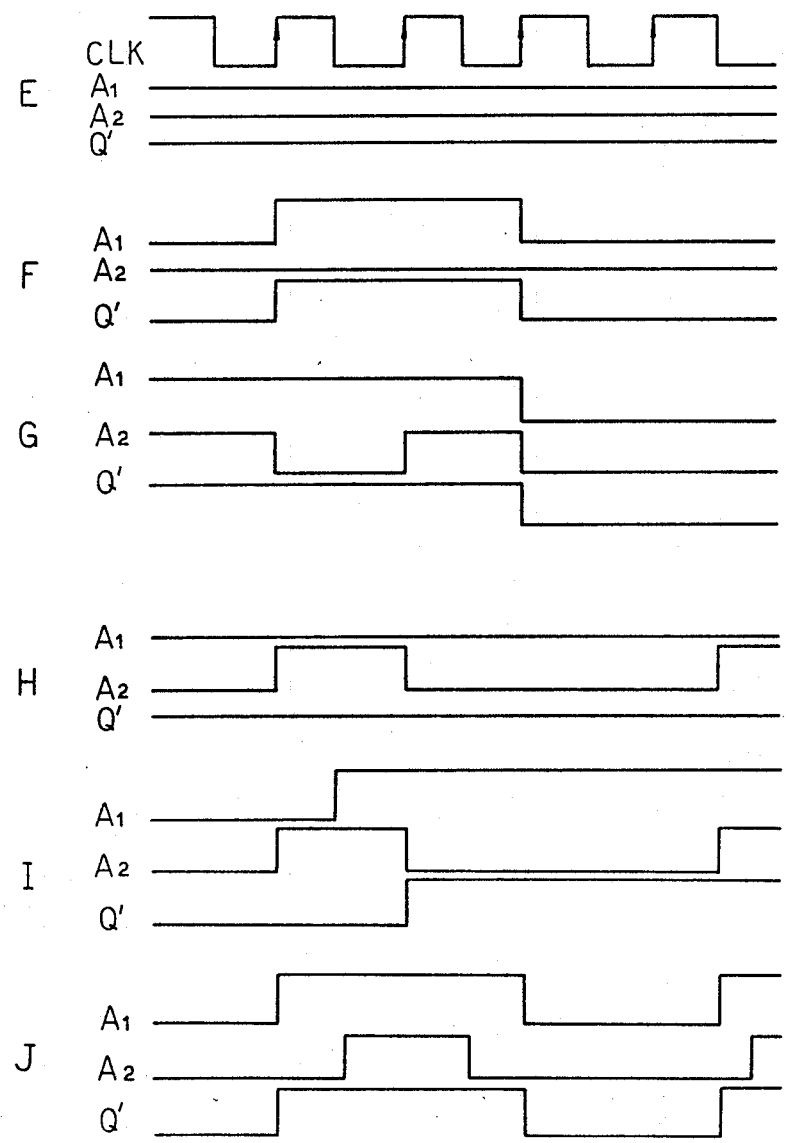
FIG. 3 illustrates waveforms of the input and output signals of the signal comparator in FIG. 1.

When the first load is in operation, but the second load is in an OFF state, the waveforms A$_1$ and A$_2$ in the portion F of FIG. 3 and applied to, and the waveform Q' is output from, the comparator 20, respectively, corresponding to the portion I of the waveform A shown in FIG. 2. Therefore, the portion I of the waveform C of FIG. 2 drives the first load driving circuit.

When the second load starts to operate during the operation of the first load, the high level signals, such as in the portion II of the waveforms A and B shown in FIG. 2, are applied to the comparator 20, through the diode D$_1$ to the NOT gate G$_4$ and the AND gate G$_1$, and also to the AND gate G$_2$ through the delay circuit, comprising the resistor R$_9$ and the capacitor C$_2$ respectively. Simultaneously, the high level output from the terminal Q of the flip-flop FF in the start sensing section 400 is applied to the AND gates G$_1$ and G$_2$.

At this moment, the compatator 20 receives or generates the waveforms G of FIG. 3. Therefore, only somewhat delayed output of the AND gate G$_2$ is applied to the OR gate G$_3$ which generates high level output.

Consequently, the timer 30 of timer section 600 becomes enabled and the timer 30, which operates as long as preset by the user, makes the second load driving circuit operate.

At this moment, since the output from the output terminal $\overline{Q}$ of the flip-flop FF becomes low, the transistor Q$_1$ of the display section 500 becomes off and the transistor Q$_2$ is turned on. Consequently, the light emitting diode L becomes ON and indicates that the second load is operating.

After that, the timer 30 stops operating and a low level signal is applied to the reset terminal R of the flip-flop FF. At this moment, since the outputs from terminals Q and $\overline{Q}$ of the flip-flop FF are unterchanged, the terminal $\overline{Q}$ outputs a high level and turns on the transistor Q$_1$ and turns off the transistor Q$_2$, thereby indicating that the second load is not operating.

When the first and second loads are started at the same time, the waveforms A and B as shown in the portion III of FIG. 2, are applied respectively to the signal comparator 20, which operates the first load driving circuit by its output as shown in the portion J of FIG. 3, and to the AND gates G$_1$ and G$_2$ after being delayed as long as the charge time $\Delta t_1$ of the capacitor C$_2$ of the delay circuit in case of the AND gate G$_2$, thereby the starting and stopping of the timer 30 is delayed as long as the delay time $\Delta t_1$ and $\Delta t_2$ respectively. Therefore, the second load driving circuit is operated by the waveform D according the operation of the timer 30. Hence, it is found that there is no problem regarding the delayed operation of the second load.

If the second load in an is started to operate with the first load OFF state, the signals of the wave forms A and B of the portion IV of FIG. 2 are generated. When the start switch SW is touched, a high level signal comes out of the AND gate $G_2$, due to the high level output of the flip-flop FF and the low level output of the operational amplifier $OP_2$. Then, the high level signal is applied to the timer 30 through the OP gate $G_3$.

Thus, the second load driving circuit is operated by the timer 30, and the waveforms in the portion H of FIG. 3 are applied to the signal comparator 20 through the diode $D_2$ and the resistor $R_8$. In this state, the comparator 20 outputs a low level signal and thus cannot drive the first load. On the other hand, both the transistor $Q_2$ and the LED L become ON, because the transister $Q_1$ becomes OFF due to the low level signal coming out from the terminal $\overline{Q}$ of the flip-flop FF.

When the first load is started during the operation of the second load, the waveforms in the portion V of FIG. 2 are generated and applied to the comparator 20 and also the AND gates $G_1$ and $G_2$. Therefore, the comparator 20 delays generating its output until the timer ends its operation and so, the waveform in the portion of I shown in FIG. 3 comes out from the teminal Q' of the comparator 20.

In other words, the first load is protected against overload because the operation of the first load is delayed until the operation of the second load is stopped.

As described above, the operation of the control circuit of the present invention depends on the circumstances as shown in the truth table of FIG. 4. In FIG. 4, the numerals 1 and 0 referenced to the loads indicate ON and OFF state of the first and second loads respectively. The numeral 1 referenced to the delay time, indicates the operation after the lapse of thre delay time, and O indicates the operation within the delay time. FIG. 4 may be regarded as the functional truth table applied to the present invention.

Whereas the present invention has been described in particular relation to the drawings attached hereto, it should be understood that other and further modifications, apart from those shown or suggested herein, may be made within the spirit and scope of this invention.

What is claimed is:

1. A control circuit for use in controlling a refrigerator circuit combined with a microwave oven, comprising:
    a signal delay selecting and comparing means, including a signal comparator, for controlling the start-up of the refrigerator circuit, the refrigerator circuit consuming a relatively small current, and the microwave oven requiring a relatively large current, and including a logic circuit for controlling the comparator;
    a start sensing means, having a flip-flop toggled by a start switch, for sensing the start of the microwave oven;
    a display means, connected to said start sensing means, for displaying the operation of the microwave oven;
    a timer means for causing a delay between the operation of said refrigerator circuit and said microwave oven; and
    a load driving means for driving said refrigerator circuit and said microwave oven, having at least two driving circuits connected to said sensing means and said timer means.

2. A control circuit according to claim 1, further comprising:
    a temperature control means, having an operational amplifier, for controlling the start of the refrigerator circuit by determining an input bias by means of a variable resistor connected to one input terminal of said operational amplifier; and
    a temperature sensing and controlling means, having a differential amplifier, for receiving a hysteresis output of said temperature control means and for comparing said hysteresis output with bias current of a temperature sensing thermistor connected to a terminal thereof.

* * * * *